United States Patent [19]
Stahl

[11] Patent Number: 6,136,279
[45] Date of Patent: Oct. 24, 2000

[54] REFORMER FURNACE WITH INTERNAL RECIRCULATION

[75] Inventor: Henrik Otto Stahl, Rungsted Kyst, Denmark

[73] Assignee: Haldor Topsoe A/S, Lyngby, Denmark

[21] Appl. No.: 09/173,459

[22] Filed: Oct. 16, 1998

Related U.S. Application Data

[60] Provisional application No. 60/062,888, Oct. 23, 1997, and provisional application No. 60/064,191, Nov. 4, 1997.

[51] Int. Cl.[7] ..................................................... B01J 8/06
[52] U.S. Cl. ........................ 422/197; 422/196; 422/198; 422/211; 48/61; 48/94
[58] Field of Search .......................... 422/194, 196–200, 422/211; 48/197 R, 61, 94

[56] References Cited

U.S. PATENT DOCUMENTS

| | | | |
|---|---|---|---|
| 3,787,038 | 1/1974 | Tesner et al. | 431/351 |
| 4,740,357 | 4/1988 | Buswell et al. | 422/197 |
| 4,861,347 | 8/1989 | Szydlowski et al. | 422/200 |

OTHER PUBLICATIONS

Elvers et al., "Ullmann's Encyclopedia of Industrial Chemistry", Fifth Completely Revised Edition, vol. A12, Formamides to Hexamethylenediamine, pp. 192–194, 1989.

Elvers et al., "Ullmann's Encyclopedia of Industrial Chemistry", Fifth Completely Revised Edition, vol. A13, High–Performance Fibers to Imidazole and Derivatives, pp. 319–326, 1989.

*Primary Examiner*—Hien Tran
*Attorney, Agent, or Firm*—Ostrolenk, Faber, Gerb & Soffen, LLP

[57] ABSTRACT

A reformer furnace having a cylindrical shell with an open outlet end in bottom of the shell, and a burner surrounded by a wall spaced apart the burner arranged within the shell and spaced apart from inner wall surface of the shell, thereby defining a reformer chamber between the burner wall and inner surface of the shell and a combustion chamber within the wall surrounding the burner. One or more reformer tubes, having an outer tube with a closed end and an open ended inner tube are arranged vertically within the reformer chamber, so that a hot flue gas from the burner circulates with an upward flow in the combustion chamber and a downward flow in the reformer chamber.

3 Claims, 1 Drawing Sheet

REFORMER FURNACE WITH INTERNAL RECIRCULATION

This application claims the benefit of U.S. Provisional Application Ser. No. 60/062,888, filed on Oct. 23, 1997 and U.S. Provisional Application Ser. No. 60/064,191 filed on Nov. 4 1997.

BACKGROUND OF THE INVENTION

Steam reforming is a chemical process by which hydrocarbon and steam react to form hydrogen, carbon monoxide and carbon dioxide. The reaction is strongly endothermic.

The reactor in which this process takes place is a reformer.

One type of reformer consists of a furnace, equipped with a number of tubes filled with an appropriate reforming catalyst. Hydrocarbon and steam flow through the reformer tubes. Burners in the furnace supply the heat, which is transferred to the reformer tubes in which the endothermic reforming reaction takes place.

The burners of a reformer furnace may be arranged in different ways. One of the best ways is to place a large number of burners on the furnace walls in such a way that the walls are heated and reflect this heat by radiation to the reformer tubes. The general object of this invention is to provide a reformer furnace that releases heat to the tubes from a large surface of uniform high temperature rather than from the small and very hot volume of a flame.

SUMMARY OF THE INVENTION

This invention provides a reformer furnace having a cylindrical outer shell with an open outlet at the bottom; a burner concentrically surrounded by a wall spaced apart from the cylindrical outer shell, thereby defining an annular reformer chamber between the burner wall and the inner surface of the outer shell and a combustion chamber within the wall surrounding the burner. One or more reformer tubes, having an outer tube with a closed end and an open ended inner tube are arranged vertically within the reformer chamber, so that hot flue gas from the burner circulates with an upward flow in the combustion chamber and a downward flow in the reformer chamber.

DESCRIPTION OF THE PREFERRED EMBODIMENT

Figure 1:
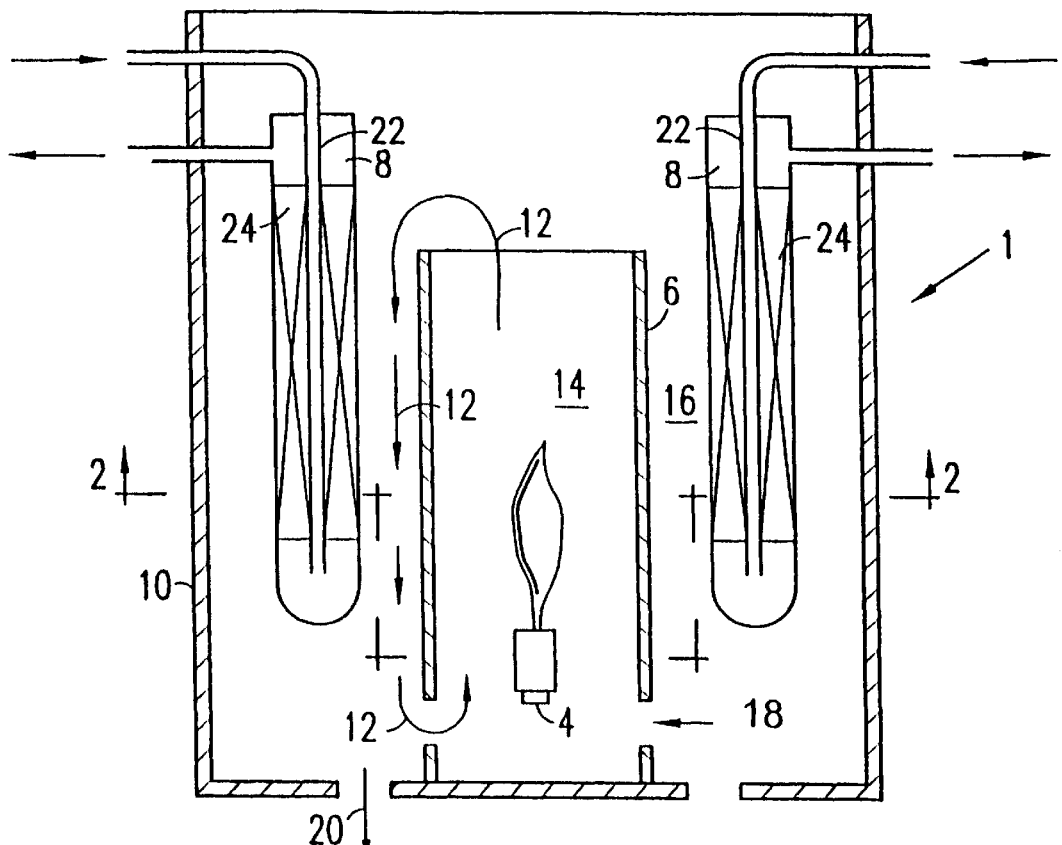
FIGS. 1 and 2 of the appended drawing diagrammatically illustrate the reformer furnace of this invention in vertical section and horizontal section taken across lines 2—2, respectively.
Figure 2:
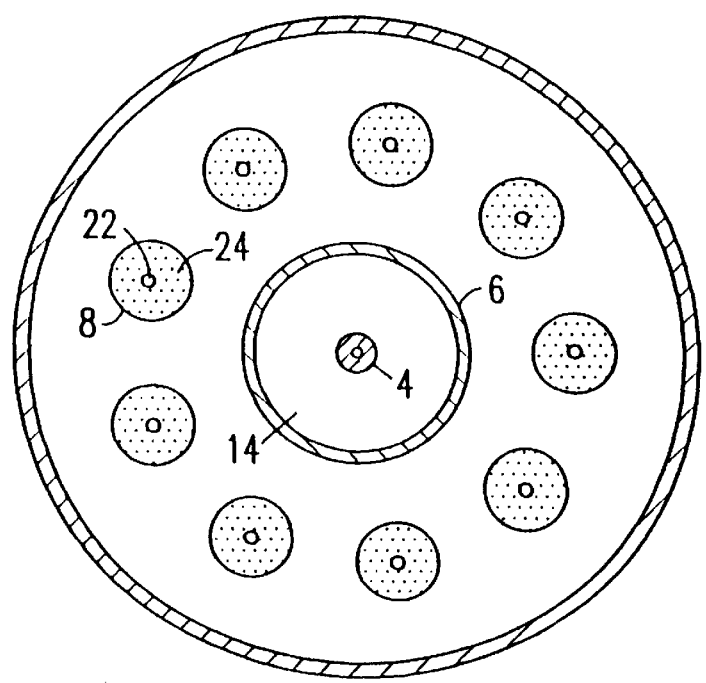

Referring to the drawing, the furnace 1 has one large burner 4, placed at the furnace bottom. The burner is surrounded by a wall 6, which is open at the top and has openings at the bottom. The reformer tubes 8 are placed outside this burner wall and inside the furnace outer wall 10. When the burner is in function, the flue gas from the flame will circulate around the burner wall 6 as shown by the arrows 12 in the Figure. The flue gas will have an upwards flow in the combustion chamber 14 and a downwards flow when it is cooled in the reformer tube chamber 16. When the flue gas at the furnace bottom flows through the burner wall openings 18, a part of it will leave the furnace as shown by arrows 20, while the main part will mix into the upwards flow in the combustion chamber.

By control of the circulation rate, the temperature of the burner wall is adjusted to a level where uniform radiation to the reformer tubes in combination with the convection from the downwards flow will supply the necessary heat for the reforming process.

Each reformer tube 8 has an open ended central passageway 22 surrounded by a catalyst bed 24 containing steam reforming catalyst. Feed to be reformed is fed downwardly to the central passageway and passes upwardly through the catalyst bed, and the product leaves from the top of the catalyst bed.

A preferred layout provides one burner surrounded by the burner wall, which is surrounded by a circular arrangement of reformer tubes, which again is surrounded by an outer circular furnace wall.

Another preferred layout is in the form of a multi-burner furnace with a number of burners, each surrounded by a burner wall in a matrix of reformer tubes, placed in a square or rectangular furnace.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A reformer furnace comprising:

an outer shell with an opening in its bottom;

at least one burner surrounded by a wall spaced apart from the burner, said wall being arranged within the outer shell and spaced apart from inner surface of the shell, said wall being open at the top and having at least one opening at the bottom thereby defining a reformer chamber between the wall and inner surface of the shell and a combustion chamber within the wall surrounding the burner; and one or more catalytic reformer tubes, each tube comprising an outer tube for containing a catalyst with a closed outlet end and an open ended inner tube, the reformer tubes being arranged vertically within the reformer chamber, so that a hot flue gas from the burner circulates with an upward flow in the combustion chamber and downward flow in the reformer chamber and a portion of the hot flue gas recirculates from the reformer chamber to the combustion chamber.

2. A reformer furnace as in claim 1, wherein said outer shell is cylindrical, the at least one burner comprising a single burner surrounded by said wall concentrically arranged within the shell, and the reformer chamber is annular.

3. A reformer furnace as in claim 1, wherein a plurality of the at least one burner is provided within the outer shell, each burner being surrounded respectively by one of said walls spaced apart from the burner.

* * * * *